United States Patent [19]

Oliker

[11] Patent Number: 4,479,814
[45] Date of Patent: Oct. 30, 1984

[54] RECIRCULATION REGENERATION

[75] Inventor: Michael D. Oliker, Amesbury, Mass.

[73] Assignee: Near Equilibrium Research Associates, Amesbury, Mass.

[21] Appl. No.: 484,176

[22] Filed: Apr. 12, 1983

Related U.S. Application Data

[60] Continuation-in-part of Ser. No. 361,134, Mar. 24, 1982, , which is a division of Ser. No. 166,054, Jul. 7, 1980, Pat. No. 4,324,564.

[51] Int. Cl.³ ............................................. B01D 53/04
[52] U.S. Cl. ...................................... 55/162; 55/180; 55/208; 55/387
[58] Field of Search .................. 55/18, 20, 21, 33–35, 55/60, 62, 74, 75, 77, 79, 161–163, 179–181, 208, 387, 389, 390

[56] References Cited

U.S. PATENT DOCUMENTS

| | | | |
|---|---|---|---|
| 2,535,902 | 12/1950 | Dailey, Jr. | 55/33 |
| 2,562,334 | 7/1951 | Roberts | 34/34 |
| 2,675,089 | 4/1954 | Kahle | 55/62 |
| 2,699,837 | 1/1955 | Van Note | 55/33 |
| 2,747,681 | 5/1956 | Schuftan et al. | 55/180 |
| 2,880,818 | 4/1959 | Dow | 55/62 |
| 3,061,992 | 11/1962 | Russell | 55/62 X |
| 3,137,549 | 6/1964 | Kilgore et al. | 55/62 X |
| 3,177,631 | 4/1965 | Tamura | 55/79 X |
| 3,193,985 | 7/1965 | Siggelin | 55/33 |
| 3,216,178 | 11/1965 | Sauty | 55/33 |
| 3,323,288 | 6/1967 | Cheung et al. | 55/62 X |
| 3,359,706 | 12/1967 | Zankey | 55/20 |
| 3,405,507 | 10/1968 | Spencer et al. | 55/180 X |
| 3,446,031 | 5/1969 | Chi et al. | 55/34 |
| 3,542,525 | 11/1970 | Pigford et al. | 55/62 X |
| 3,577,867 | 5/1971 | Barrere, Jr. | 55/180 X |
| 3,712,027 | 1/1973 | Hasz | 55/33 |
| 3,738,084 | 6/1973 | Simon et al. | 55/31 |
| 3,808,773 | 5/1974 | Reyhing et al. | 55/31 |
| 3,850,592 | 11/1974 | Huffman | 55/33 |
| 3,950,154 | 7/1976 | Henderson et al. | 55/33 |
| 4,012,206 | 3/1977 | Macriss et al. | 55/34 |
| 4,030,896 | 6/1977 | Wimber et al. | 55/33 |
| 4,165,972 | 8/1979 | Iles et al. | 55/179 X |
| 4,233,038 | 11/1980 | Tao | 55/33 |
| 4,324,564 | 4/1982 | Oliker | 55/35 X |

FOREIGN PATENT DOCUMENTS 1670  1/1979  Japan .................................... 55/180

OTHER PUBLICATIONS

D. Basmadjian, On the Possibility of Omitting the Cooling Step in Thermal Gas Adsorption Cycles, Can. J. of Chem. Eng., vol. 53, Apr. 1975, pp. 234–238.
Lukchis, Adsorption Systems, Part II, Chemical Engineering, Jun. 11, 1973, pp. 111–116.
Lukchis, Adsorption Systems, Part II, Chemical Engineering, Jul. 9, 1973, pp. 83–87.
Lukchis, Adsorption Systems, Part III, Chemical Engineering, Aug. 6, 1973, pp. 83–90.
Johnston, Designing Fixed-Bed Adsorption Columns, Chemical Engineering, Nov. 27, 1972, pp. 87–92.
Wankat, The Relationship Between One-Dimensional and Two-Dimensional Separation Processes, AIChE Journal, vol. 23, No. 6, pp. 859–867.
Collins, The LUB/Equilibrium Section Concept for Fixed-Bed Adsorption, Chemical Eng. Progress Symposium Series, vol. 63, No. 74, pp. 31–35.
Rhee et al., An Analysis of an Adiabatic Adsorption Column, Chemical Eng. Journal (1) 1970, pp. 279–290.

Primary Examiner—Robert Spitzer
Attorney, Agent, or Firm—Lahive & Cockfield

[57] ABSTRACT

Disclosed are improved recirculating sorption bed systems of the type in which one sorption bed is in sorption duty while another is being regenerated thermally by a recirculating regeneration loop. The regeneration loop includes a cooler/condenser, a heater, and a tertiary sorption bed. The tertiary bed takes up sorbate from the coolant stream that may contain sorbate as a result of operating the system with the Four Front Method disclosed in U.S. Pat. No. 4,324,564. In some embodiments, the cooler/condenser is of the type which cools and removes sorbate from the recirculating regenerant stream by direct contact between a cooling fluid and the effluent. In other embodiments, the cooler/condenser retains condensed sorbate. In still other embodiments, the effect of the tertiary bed is improved by providing means for bypassing the bed with a portion of the stream from the heater, or by incorporating the heater into the tertiary bed.

36 Claims, 22 Drawing Figures

RECIRCULATION REGENERATION

This application is a continuation-in-part of Ser. No. 361,134, filed Mar. 24, 1982 which is a division of Ser. No. 166,054, filed July 7, 1980 now U.S. Pat. No. 4,324,564, entitled Adsorption Beds and Method of Operation Thereof, issued Apr. 13, 1982.

Filed on even date herewith are related U.S. application Ser. Nos. 484,186, 484,159, and 484,184.

This invention relates to an efficient method of operating sorption bed systems of the type which are regenerated by recirculation of a hot gas stream, and to bed systems designed to exploit that method. The methods relate to operating zeolite, silica gel, alumina, activated carbon, thermally regenerable ion exchange resin, and other such beds of the type employed to remove impurities from fluid streams such as natural gas, air, or water. The invention relates particularly to multiple bed systems which allow a continuous feed stream to be continuously treated. In such systems feed is directed to a first bed in a sorption stage while a second bed is regenerated. Then, typically by valve controls, the feed stream is redirected through the second, regenerated bed to be stripped of sorbates while the first, now sorbate-loaded bed, is switched to a system for regeneration, and so on.

Sorbents are widely used for the purification of fluid mixtures. The sorbent material or materials, typically in particulate form or in the form of an absorbent disposed on a solid support, are contained in a vessel which provides means for passing fluid along flow path through the interstices among the particles in the bed. A fluid feed stream containing a dilute species (sorbate) to be removed, typically at concentrations no greater than about 15 percent, is introduced into the bed and passed along the flow path in a sorption stage. Inside the bed a sorption wave or front forms which passes along the flow path from a point adjacent the bed entrance in the same direction as the fluid flow, but at a much slower rate.

This sorption front is the bed region wherein changes in sorbent loading and sorbate content in the fluid phase occur. The front's upstream side is bounded by a bed region characterized by sorbent loadings, sorbate to fluid feed mole ratios, and temperatures characteristic of equilibrium between the sorbent material and the feed. On its downstream side, the sorption front is bounded by a bed region having properties characteristic of equilibrium between the sorbent material and the substantially sorbate-free fluid product. Front boundaries are generally not well-defined but rather comprise regions which asymptotically approach equilibrium. As the downstream boundary of the sorption front approaches the bed exit, the concentration of sorbate in the product begins to rise. When the concentration of the sorbate in the product at the exit exceeds some predetermined specification, sorption is discontinued and the bed is regenerated.

In the regeneration stage, a regenerant comprising a hot fluid is passed along the flow path in a co-current, or more commonly, a countercurrent direction. The high temperature of the regenerant produces a desorption front in the bed which drives sorbate from the sorbent material and into the flowing regenerant stream. This process continues until the bed is substantially sorbate-free, typically as indicated by the emergence of hot regenerant fluid at the bed exit. The hot, sorbate-free bed is then either cooled or utilized for sorption service while still hot. The introduction of a coolant produces a thermal front which takes heat from the bed.

Sorption bed systems of the type described above are known as "thermal swing" systems because they are regenerated with heat. They have been widely utilized in various industries. For example, in preparing air for use in pneumatic systems, water vapor is often first removed from the air using activated alumina or a zeolite. Natural gas is similarly treated before it is liquified or delivered to a pipeline. Activated carbon is used to remove trace quantities of organic vapors from air in solvent recovery operations. Similarly, carbon dioxide, mercury, oxides of nitrogen and sulfur, and hydrogen sulfide may be removed from air or exhausts on zeolite molecular sieves or on activated carbon. Recently, thermally regenerable ion exchange resins have been developed which, for example, can remove salts from water.

U.S. Pat. No. 4,324,564 is expressly incorporated by reference into this application. That patent discloses how by suitably modifying the cycle of operation of beds of the type described above it is possible to significantly reduce the quantity of heat needed for regeneration, to increase the throughput of a bed of a given size, to decrease the size and thus the capital costs of a bed system required to achieve a given capacity, to upgrade the quality of the product (reduce sorbate concentration), and to provide greater security against breakthrough of feed during the sorption stage.

Because the operational method described therein arose from an in-depth study of the thermodynamics and kinetics involved in the operation of sorption bed systems regenerated with heat, and because the method involves timing of the four fronts often created in the bed during use, the operational method disclosed therein is named the "Four Front Method".

During regeneration there is created in the bed a front, designated herein as the "RW" front, which is bounded on its downstream side by bed conditions characteristic of equilibrium between the sorbent material and fluid waste ("W", sorbate rich effluent), and on its upstream side by bed conditions characteristic of equilibrium between the sorbent material and hot regenerant fluid ("R"). Upon the subsequent introduction of cooling fluid, there is also created a wave or front, designated therein as a thermal front, which moves more rapidly than the RW front. The thermal front can arise in several ways. When regeneration is conducted using sufficiently hot fluid containing a substantial concentration of sorbate and the coolant is sorbate-free, a "PR" transition is created comprising a fast stripping front which removes all or much of the sorbate on the bed that was in equilibrium with the hot regenerant, and a thermal front which effects the major amount of temperature transition. Upstream of this transition from equilibrium with coolant to equilibrium with regenerant, the bed is in equilibrium with coolant (here assumed to be product, "P", for purposes of simplicity). Downstream of the transition the bed is in equilibrium with regenerant ("R"). Other situations where sorbate is present in the regenerant and/or the coolant produce multiple fronts which together form the PR transition, one of which comprises the major thermal front. When regeneration and cooling are accomplished using substantially sorbate-free fluid, the PR transition is a pure thermal wave which is bounded on its downstream side by bed conditions characteristic of equilibrium between the sorbent and the hot regenerant fluid, and on its upstream side by bed conditions characteristic of equilibrium between the sorbent and the cooling fluid. The invention disclosed in U.S. Pat. No. 4,324,564 resides in the discovery that the cooling fluid may be introduced into the bed prior to the breakthrough of the midpoint of the RW front at the bed exit to achieve many significant operational advantages. Preferably, introduction of the cooling fluid is timed such that the thermal component of the PR transition is present in the last third of the bed length or most preferably at the fluid exit when the slower RW front is at or breaking through the fluid exit. Operation of the bed in this manner can result in a waste fluid whose temperature as measured at the bed exit never attains the temperature of the hot regenerant. As one result, significantly less heat is required to regenerate the bed.

The precise timing of the beginning and end of the sorption stage and the hot regenerant and cooling fluid steps of the regeneration stage for a given system depends primarily on bed length, the particular sorbate-sorbent pair involved, fluid flow rates, and a balancing of the importance of the desired product characteristics, the reduction in heat consumption, the desired degree of security against breakthrough, and the maximization of throughput. By following the principles disclosed therein, those skilled in the art are able to estimate from theoretical data and precisely determine empirically all of the parameters required to take full advantage of the invention.

In many prior art bed systems, regeneration is conducted using a recirculating fluid stream which contains a heater for producing the hot regenerant and a cooler/condenser which cools the recirculating regenerant during the cooling stage and removes sorbate driven off the bed.

SUMMARY OF THE INVENTION

The system of this invention provides improved operational efficiency for bed systems regenerated by means of a recirculating fluid stream. The system is modified so as to exploit the Four Front Method. The system cyclically treats a fluid flow stream in a sorption bed to reduce the concentration of sorbate carried in the stream, during a sorption stage, and thermally regenerates the sorption bed by recirculating at least one of the hot and cool streams during a regeneration stage. The system includes a main sorption bed comprising a housing defining a fluid flow path along a mass of sorbent material contained therein for treating fluid flow during the sorption stage, and a loop, which may or may not communicate with the fluid feed stream, for recirculating a regeneration stream countercurrent to the fluid feed stream during the regeneration stage. The loop may comprise means for circulating the regeneration stream through the sorbent material, means for removing sorbate from effluent exiting the sorption bed, a cooler for cooling effluent from the sorption bed, a heater located downstream from the cooler for heating said effluent, and a tertiary or "regeneration" bed, coincident with or downstream from the heater, containing a sorbent material for reducing the concentration of sorbate in the sorption bed's effluent.

In a preferred system, the regeneration bed, contains a mass of sorbent material that is less than 50% that of the mass of the sorbent material in the main sorption bed. The sorbent material of the regeneration bed may be a different material than the sorbent material in the sorption bed. Preferably, the mass of sorbent material in the main regeneration bed is less than 30% that of the mass of the sorbent material in the main sorption bed.

A preferred approach to operating the system is to provide a plurality of main sorption beds, and valve means for alternately operating a subset of the main sorption beds in the sorption stage while the others are operated in the regeneration stage.

In one embodiment of the invention, the means for removing sorbate from effluent from the main sorption bed and the cooler for cooling the effluent are combined as a cooler/condenser. The condenser may be of conventional design or may comprise a cooling fluid inlet, a cooling fluid outlet, means defining a flow path for effluent through the cooler/condenser, a heat transfer interface between the cooling fluid and effluent within the cooler, and a condensed sorbate outlet. Since the effluent from the main sorption bed need never be completely sorbate-free using the system of the invention, the heat transfer interface of the cooler/condenser may comprise a mixing zone wherein the cooling fluid and the effluent are mixed and the cooling fluid outlet may be the same outlet as the condensed sorbate outlet. Alternatively, the heat transfer interface may comprise a conduit for transporting the cooling fluid between the inlet and the outlet, means for retaining a portion of condensed sorbate produced within the cooler/condenser in contact with the conduit, and means for passing the effluent through the retained portion of condensed sorbate.

During operation of the system of the invention, the regeneration bed is used to trap sorbates escaping the cooler/condenser so as to prevent their redeposition in the main bed during late stages of the regeneration. Sorbate held in the regeneration bed at the end of the regeneration stage are delivered as a pulse of effluent containing sorbates to the main bed at the beginning of the next regeneration cycle. To optimize performance of the system, it is preferred that the pulse be a long, relatively uniform, low sorbate concentration pulse, as opposed to a short, concentrated pulse. This goal can be achieved by providing means, located upstream from the main bed, for heating effluent from the regeneration bed in the loop, and means for activating and inactivating the heating means. The heating means may comprise a second heater, downstream of the regeneration bed. It may also comprise a heater within the regeneration bed. In fact, such a heater within the regeneration bed may serve as the sole heater in the system. An alternative arrangement for reducing the average concentration of sorbate in the effluent pulse is to provide means for bypassing the regeneration bed, controlled by valves arranged to allow a portion of hot regenerant fluid to bypass the regeneration bed while an external heater located upstream is on. The regeneration bed effluent is thus reheated by mixing with hot regenerant fluid from the heater, and the sorbate content in effluent leaving the regeneration bed is diluted.

The heater which alters the sorbate concentration in the effluent output of the regeneration bed may be coincident with, that is, within, the regeneration bed. Therefore, a heater within the regeneration bed is part of one preferred embodiment of the invention. The regeneration bed may also be filled with zeolite or other strong sorbent material so that its effluent is relatively hot and the sorbate content therein relatively low and uniform.

In the operation of the system, during the regeneration stage, during an interval when the heater is activated, a hot regenerant fluid enters the sorption bed and creates therein an RW front which moves in the direction of fluid flow and is bounded on its downstream side by bed conditions characteristic of equilibrium between the sorbent material and a fluid waste rich in sorbate, and on its upstream side by bed conditions characteristic of equilibrium between the sorbent material and the hot regenerant fluid, and the system includes means for inactivating the heater prior to the time the midpoint of the RW front exits the sorption bed. Inactivation of the heater initiates cooling of the main bed. The inactivating means may be a timer in situations where feed is delivered at a substantially constant flow rate and has substantially constant sorbate content, or in situations where the convenience and efficiency of a timer outweigh any variations of feed flow rate or content that make timer activation less than optimal.

Alternatively, the inactivating means for the system may comprise means for sensing an intrinsic property characteristic of the fluid at a selected point within the bed. Examples of intrinsic properties are temperature and sorbate concentration.

The system of the invention may be used with a variety of fluid feeds and sorbates. It is effective when the sorbate is water or a mixture of hydrocarbons, and when the fluid feed is natural gas and the sorbate comprises a mixture of $C_4$-$C_{10}$ petroleum fractions. The system may include means for extracting from the cooler/condenser a petroleum fraction rich in a hydrocarbon selected from a group consisting of pentane, hexane, heptane, octane, nonane, and decane.

Objects of the invention include the provision of a bed system of the recirculating regeneration type which can utilize the the Four Front Method in multiple bed, cycling systems. These advantages include avoiding the generation of excess waste heat, reducing the bed size needed to achieve a given throughput, and reducing the quantity of regenerant fluid needed. The inclusion of the regeneration bed makes the use of the Four Front Method especially efficacious for multiple bed, recirculating regeneration systems. Also, because operation of the system results in the absence of dry air coming out of the main sorption bed into the cooler/condenser during the regeneration stage, simpler and more economical cooler/condenser arrangements can be used in the regeneration system than was possible for conventional systems.

BRIEF DESCRIPTION OF THE DRAWING

These and other objects and features of the invention will be apparent from the following description of preferred embodiments of the invention and from the drawing wherein like reference characters in the respective drawn figures indicate corresponding parts. In the drawing.

DESCRIPTION

Front Behavior

Figure 1:
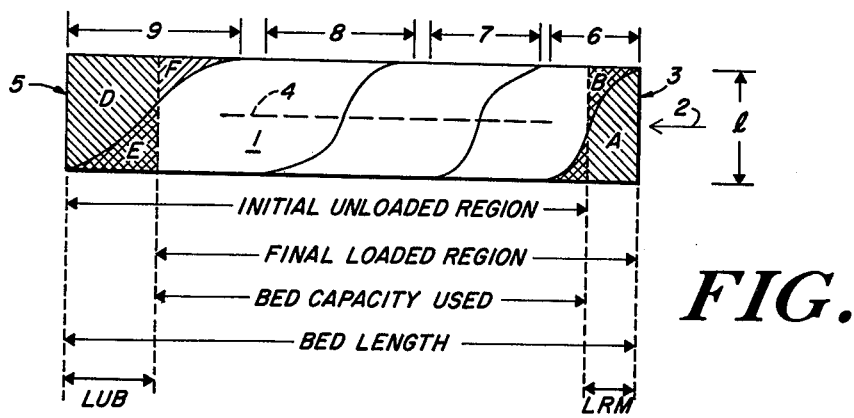
FIG. 1 is a schematic illustration of a sorption bed useful in describing the sorption stage and the concept of a front wherein bed loading weight ratio of sorbate to sorbent is depicted graphically on the bed's vertical axis.

In order to understand fully the nature and advantages of the invention, it is necessary to understand certain aspects of the physical chemistry of bed systems.

In the normal operation of sorption beds, a feed fluid bearing a sorbate (e.g., water vapor) enters the bed and is "purified" as the sorbate is sorbed (loaded) onto the sorbent material (e.g., silica gel). A product of significantly reduced sorbate concentration exits the bed. When the bed is loaded to its capacity, the product begins to exhibit increasing sorbate content, and the bed must be regenerated.

Changes in a sorption bed take place through the medium of waves or fronts. These consist of profiles or spacial variations in the concentration of sorbate (y) in the feed fluid, loading of the sorbate on the solid (1) and temperature of the solid and fluid (T). The fronts move along the bed in the direction of fluid flow but at a much slower rate. A front consists of a transition from one equilibrium condition in the bed to another. From the midpoint of the front, each equilibrium condition is approached asymptotically. As the front moves, the sorbent material and the fluid in the bed exchange heat and mass. For example, during the sorption stage, the upstream region of the bed that is near equilibrium with the fluid feed grows progressively larger while the downstream region that is near quilibrium with the fluid product grows progressively smaller. The product fluid exiting the bed is thus substantially in equilibrium with the original (pre-sorption) condition of the bed. As sorption continues, the product exiting the bed moves progressively further from this equilibrium state as the front approaches the bed exit and in the extreme (as the sorption front breaks completely through) approaches a composition identical to the feed. In any industrial operation, the sorption stage is terminated well before breakthrough.

For convenience, the various fronts discussed herein are named for the equilibrium conditions which bound them, with F representing feed, R representing regenerant, P representing product (and coolant fluid), and W representing waste. Thus, for example, the sorption front described above is termed an FP front. The speed of a front in the direction of flow can be defined on the basis of a mass balance or heat balance. Regarding the mass balance, the sorbate lost by the fluid in passing through a unit volume containing the front must equal the sorbate gained by the sorbent (increased bed loading) which results from the motion of the front. Thus, where $v_1$ is the loading velocity in mass of bed traversed by the front per unit time, $m_f$ is the fluid flow rate in mass of fluid per unit time, $\Delta y$ is the fluid concentration (weight ratio) transition (the change in sorbate concentration of the fluid measured across the front) and $\Delta l$ is the loading (weight ratio) transition across the front, $$v_1 = m_f \Delta y / \Delta l$$

Regarding the heat balance, the thermal velocity can be defined by balancing the fluid enthalpy lost with the bed heat gained, where fluid enthalpy is the sum of sensible heat plus latent heat due to the presence of sorbate. Thus, when $v_T$ equals thermal velocity, $Cp_s$ and $Cp_f$ are the respective heat capacities of the solid and fluid, and $-\Delta H$ is the heat of sorption, then $v_T = m_f(Cp_f/Cp_s + ((-\Delta H/Cp_s)\Delta y/\Delta T))$. Thus, if the ratio of the heat capacities of the fluid and solid is defined as C and the ratio of the heat of sorption to the heat capacity of the solid defined as H, then $$v_T = m_f(C + H\Delta y/\Delta T)$$

From the foregoing it is apparent that when $\Delta y$ is equal to zero (i.e., when no sorption or desorption is taking place), thermal velocity depends only on the fluid flow rate and the ratio of the heat capacities of the fluid and solid:

$$v_T = m_f C$$

When $\Delta y/\Delta T > 0$ a "fast front" results; when $\Delta y/\Delta T < 0$ a "slow front" results. Thermal velocity and mass velocity in some cases can be equal. Also, as noted above, fronts can grow or contract and do not have sharp boundaries.

The Sorption Stage

The sorption or FP front behaves identically in the prior art and in the Four Front Method employed in the process and system of this invention. Specifically, the entering fluid feed is cool and contains a relatively large amount of sorbate, and the exiting product leaves the bed at a higher temperature and is largely sorbate-free. The bed, initially warm and sorbate-free for the most part as a consequence of its previous regeneration, gains sorbent and loses heat as fluid is passed therealong. One potential difference between the method of the invention and the prior art is that in the Four Front Method the regeneration process may leave some sorbate in the bed adjacent the feed entrance. This amount of sorbate is referred to herein as the "residual mass" (or RM) and can serve as the initial state for the sorption stage. Because in the prior art cooling is normally not started until regenerant breaks through, little or no residual mass is present in the bed at the start of the sorption stage.

When the sorbate concentration of the product fluid exiting the bed exceeds a selected predetermined specification, sorption is stopped. This results, in both the prior art and the Four Front Method, in a section of the bed adjacent the exit remaining only slightly loaded with sorbate. This section is termed herein, length of unused bed, or LUB. The FP sorption front may expand or contract as it moves long the bed with the rate of contraction or expansion depending upon heat and mass transfer coefficients, the heat and mass balances, and sorbent thermodynamics (see, e.g., Handbook of Separation Techniques for Chemical Engineers—1979, §3.1).

Referring to FIG. 1, the characteristics of a typical FP front are illustrated. Fluid feed entering bed 1 in the direction of arrow 2 (right to left) at feed entrance 3 passes along the fluid flow path 4 and leaves the bed via exit 5. The lengths of the sorption front at various times during its passage along flow path 4 are shown at 6, 7, 8 and 9. As illustrated, as the front passes through the bed, the fraction of bed length where a loading gradient appears may grow progressively larger. Downstream of the front, conditions of 1, y, and T are characteristic of equilibrium between the sorbent and the product. Upstream of the front the values of 1, y, and T are characteristic of equilibrium between the sorbent and the feed. During sorption, $\Delta l$ and $\Delta y$ across the front in the direction of flow are negative. The length of bed remaining (as measured from the midpoint of the front) when sorption is terminated determines how much of the bed is left unloaded. This length or mass of bed (D) constitutes the length of unused bed (LUB) mentioned above and has the property illustrated in FIG. 1: two regions, E and F, of equal area set off by the line at LUB, which illustrates the midpoint of the sorption front.

The residual mass present at the outset of the sorption stage is largely contained in length or mass of bed A (the length of residual mass or LRM). As with LUB, areas B and C are equal.

As is apparent from FIG. 1, the fraction of the capacity of the bed actually used is reduced both by the length of unused bed and the length of the residual mass. However, LRM can be reduced to zero if, as generally taught in the prior art, regeneration is continued until the temperature of the fluid exiting feed entrance 3 during regeneration closely approaches the regenerant gas temperature.

Conventional Operation

FIGS. 2A–2E comprise a series of diagrams illustrating changes in bed loading, sorbate concentration in the fluid, and temperature during regeneration. In the situation illustrated, regeneration is conducted with a substantially sorbate-free hot fluid followed by a sorbate-free cooling fluid. However, as will be discussed hereinafter, both in the prior art and in the operational method of this invention, the hot regenerant fluid and cooling fluid need not necessarily be sorbate-free.

Figure 2A:
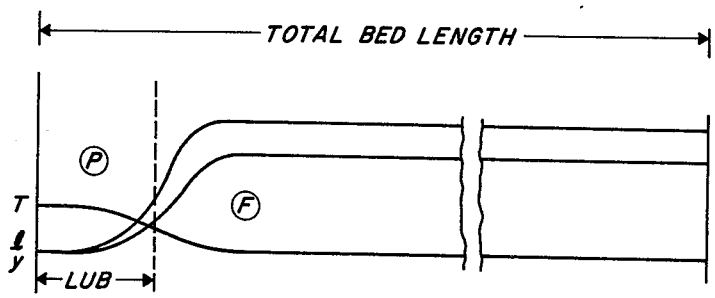
FIGS. 2A-2E are schematic diagrams illustrating the sequence of events which occurs during a complete cycle in a sorption bed operated in the conventional (prior art) manner. The horizontal axis represents the length of the bed and the vertical axis represents increasing (upward) temperature (T), bed loading (1), and sorbate/fluid feed weight ratio (y)

At the completion of the sorption stage, the conditions of bed loading, sorbate concentration in the fluid, and temperature adjacent the exit of the bed is depicted in FIG. 2A. In the usual case, the zone of increasing bed loading (1) and sorbate concentration (y) depicted in FIG. 2A (and representing the loading or FP front) will not be allowed to exit the bed. In fact, it is typically a detected rise in sorbate concentration (y) of the product (or a timed signal corresponding to the rise) which signals the controller to terminate the sorption stage and begin regeneration.

Figure 2B:
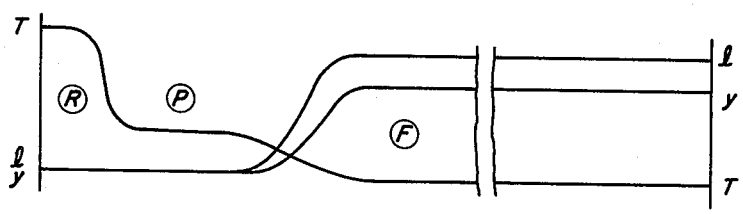

For clarity of explanation, the regenerant here is assumed to be sorbate-free. When the regenerant stream has some sorbate content (the usual case in recirculation regeneration) multiple fronts are formed, but the overall effect is similar to that shown in FIG. 2B. One important difference is that wet regenerant leaves some sorbate on the bed which is reduced or removed during a subsequent cooling phase. Thus, as shown in FIG. 2B, regeneration starts as a hot dry regenerant fluid (R), produced by actuating a heater to heat the stream, enters the bed countercurrent direction to the sorption stage flow. As the fluid enters the flow path, it first encounters the unused bed which is cool and substantially unloaded, giving rise to a thermal front designated RP. $\Delta y$ in this region is modest (depending on the sorbate content of the regenerant, so the RP front moves at or slightly greater than velocity $m_f C$.

Figure 2C:
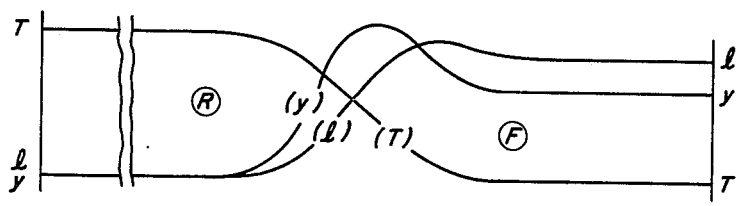

Note that loading and sorbate concentration do not substantially differ on opposite sides of the RP front illustrated in FIG. 2B, but that bed temperature on opposite sides of the front changes. The RP front immediately begins to collide with the less loaded end of sorption front, then moves into progressively more loaded regions. This front, designated FP, is illustrated in FIG. 2A and FIG. 2B, and is bounded by a bed region wherein T, y, and 1 are characteristic of equilibrium with feed (section F) and by a bed section wherein T, y, and 1 have values characteristic of equilibrium between the sorbent and product (section P). As shown in FIG. 2C, the collision of the RP and PF fronts causes an increase in the equilibrium fluid concentration (y). Sorbate is stripped off the bed but is resorbed downstream, heating and loading the bed.

Figure 2D:
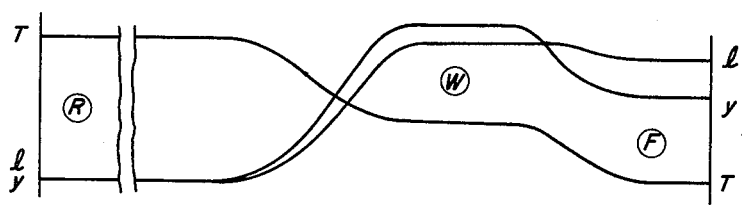

As the RP front collides and passes through the FP front, a pair of new fronts is created, designated RW and WF (FIG. 2D). Front WF is a fast sorption front (velocity $m_f C$) bounded by downstream bed conditions characteristic of equilibrium with the feed and upstream bed conditions characteristic of equilibrium with sorbate rich waste fluid produced during regeneration. The RW front is a slow desorption front bounded by a downstream bed section in equilibrium with waste and an upstream section in equilibrium with regenerant fluid. As illustrated, region W of the bed appears as a plateau in which the equilibrium temperature of the bed is intermediate that of the regenerant fluid and the feed fluid, and bed loading and sorbate concentration are high. Because of the difference in speed between the WF and RW fronts, the plateau represented by the region W lengthens as regeneration continues. The collision and transformation of the fronts are of course not instantaneous. Also, plateau W may exhibit variations as the new fronts contract and expand during formation.

Figure 2E:
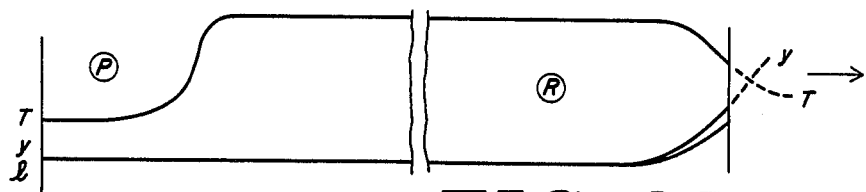

Fast front WF quickly passes through the bed and breaks through the bed exit, at which time an increase in the temperature and sorbate concentration of the effluent is observed. During this time, both the heater and a condenser in the recirculating loop are actuated so that sorbate is condensed and removed from the recirculating stream and its temperature is maintained. As regenerant fluid continues its passage through the bed, the RW front moves therealong. Its breakthrough is signalled by a decrease in sorbate concentration in the effluent and an increase in its temperature approaching that of the hot regenerant. The situation in the bed at this point is depicted in FIG. 2E. In the prior art, this observed change in effluent characteristics often served as the signal to stop the flow of hot regenerant fluid and, by turning of the heater, to begin cooling the bed back down to its operational temperature. Alternatively, a timer was used to initiate this switch at a time corresponding to the change in effluent. In other prior art systems, because of the inefficiencies in the condenser, the heater is left on until the sorbate content of the recirculating stream reached a predetermined specification. In any event, as cool dry fluid (here assumed to have the characteristics of unheated product) is fed along the bed's flow path, a coolant front PR passes rapidly therealong. Since $\Delta y$ and $\Delta 1$ across this front are essentially zero, the front is a pure thermal front having a speed close to C. While the thermal front is traversing the bed, the last vestiges of the RW front break through. When the thermal wave PR breaks out, the regeneration is complete, and the bed is ready for a return to the sorption stage.

In conventional recirculation regeneration, the regenerant stream will have a finite sorbate content and the condenser is not 100% efficient. Accordingly, after the heat is turned off, continued circulation results in a loading of sorbate on the bed adjacent the product exit. This occurs as cooling fluid containing sorbate not removed by the condenser, picked up from the hot portion of the bed, or evaporated from the condenser, deposits on the cool section of the bed near the product exit. This amount of sorbate comes out with product in the next sorption.

This conventional regeneration procedure and the four front procedure of the invention described below may be further understood from FIG. 3, a diagram depicting the temperature and sorbate concentration properties of the product and of the effluent during regeneration in terms of the mass of fluid removed from the bed.

Starting at the right and moving toward the left, it can be seen that during the conventional regeneration stage, effluent initially has a sorbate concentration (y) and temperature (T) corresponding to the feed. The effluent then undergoes an increase in sorbate concentration from $y_F$ to $y_W$ and an increase in temperature from $T_F$ to $T_W$. This change is caused by the breakthrough of the fast WF front. Next, the warm ($T_w$), sorbate-rich ($y_w$) plateau comes through for a time until the RW front breaks through, signalling the controller to switch to coolant. As the RW front breaks through, sorbate concentration in the effluent decreases to the level of the product; the temperature rises until it is substantially equal to the temperature of the regenerant gas ($T_R$) and remains at this level until the cooling wave comes through, lowering the temperature of the effluent to that of the product.

Four Front Operation

In its broadest aspects, the operational method of the invention requires that the introduction of the cooling gas be initiated prior to the emergence of the midpoint of the RW front from the bed. Contrary to intuition and the generally held belief of the prior art, timing the introduction of cooling fluid in this way results in energy saving increases in throughput with no deterioration of product quality. The benefits of operating in this manner are maximized if the introduction of the coolant is timed such that, when the RW front is at or breaking through the fluid exit, the RP cooling front (thermal front) is at the bed exit or at least in the last third of the bed length. This means that the thermal front and the major desorption (RW) front collide near the bed exit, at the bed exit, or in effect, outside the bed exit.

If the RW front were a sharp step change then the ideal situation would be to have the thermal wave and the slow desorption wave reach the bed exit precisely simultaneously. This would result in just as thorough regeneration of the bed as in the prior art technique, but less hot regenerant fluid would be needed, thereby saving heat, reducing the fraction of product needed to complete regeneration, and increasing net yield (throughput). However, as mentioned with reference to the discussion of the sorption front, the RW front is not an abrupt change but approaches the bordering equilibrium conditions asymptotically. Consequently, the cooling front RP will collide with part of the slow desorption front RW before RW completely leaves the bed. This cooling causes a decrease in y and greatly retards the desorption of any sorbate mass it passes. The thermal front RP accelerates through the collision and emerges as a fast front. However, because the collision is incomplete, a mass of sorbate is left on the sorbent adjacent the feed entrance. This mass is the residual mass (see FIG. 1). Thus, in most cases, the bed is switched to sorption duty before it is "completely" regenerated.

Figure 4A:
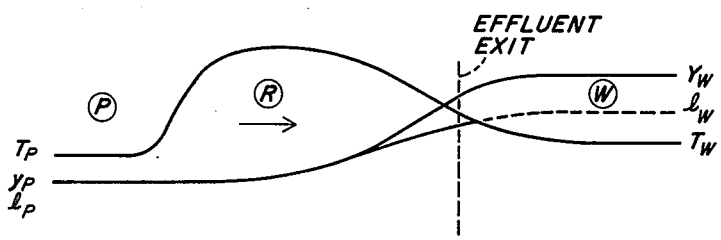
FIG. 4 is a schematic diagram illustrating the collision within the bed between a PR front and an RW front which occurs in a preferred embodiment of the process of the invention.
Figure 4B:
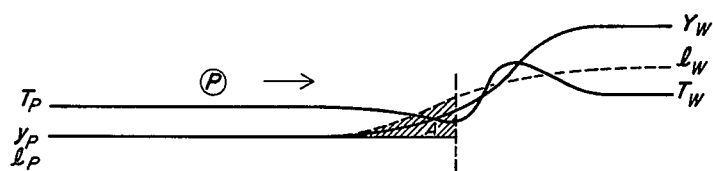

FIGS. 4A and 4B illustrate changes in y, 1, and T profiles as a result of the PR-RW collision at the fluid exit when operating in the Four Front mode at the optimum conditions. In FIG. 4A, the PR thermal wave is shown approaching the RW front which is partially broken through the effluent exit. As a result of the collision (FIG. 4B) sorbate concentration in the fluid at first rises slowly approaching the bed exit and desorption is slow here. Then, at the instantaneous location of the major temperature rise, y increases rapidly. As this rapid transition breaks through, the bed is ready for sorption duty. Area A beneath the loading curve represents a portion of the bed which has not been desorbed, i.e., the residual mass.

Figure 3:
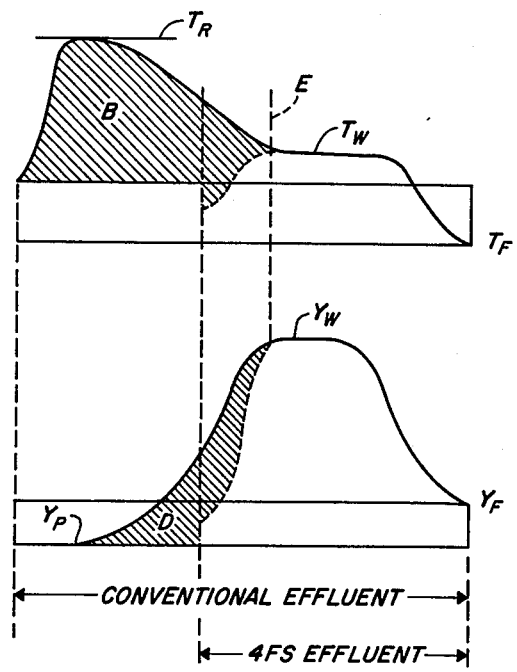
FIG. 3 is a graph illustrating the sorbate/fluid feed mole ratio and temperature (vertical axis) of the effluent stream exiting a sorption bed during the regeneration stage of a prior art conventional cycle (solid lines) and the cycle according to the invention (dashed lines). The horizontal axis represents mass of product.

In FIG. 3, the dashed lines represent the departure of the Four Front method from the prior art in terms of the characteristics of the effluent. At the outset, the curves are identical to the conventional system. However, at point E there is a marked departure from the conventional behavior. Specifically, the effluent exhibits a rapid decline in temperature to a level somewhere intermediate the temperature of the product and feed, and the sorbate concentration in the effluent decreases rapidly as compared with the conventional system. The predominant effect of these changes is a large heat saving equal to Area B and a reduction in the total sorbate contained in the effluent represented by Area D. Note also that the temperature of the effluent need not ever attain $T_R$, the temperature of the hot regenerant. Area D represents the residual mass left in the bed after regeneration. This mass of sorbate will be contained in a region of the bed (LRM) adjacent the feed entrance, as shown in FIGS. 1 and 4.

From the foregoing it can be appreciated that the operational process of the invention can be implemented by a variety of specific methods, most of which require little or no costly equipment changes. To obtain maximum benefit, the timing of the introduction of the coolant gas is set such that the sorption front RW reaches the end (effluent exit) of the bed at about the same time that the faster RP cooling front does. This is a change from conventional operation, wherein the cooling wave is started when the RW front reaches the end of the bed as indicated by decreases in sorbate concentration and increases in temperature in the effluent gas. The Four Front method has a major advantage over conventional bed operational techniques in that it reduces the mass of hot regenerant used in the conventional regeneration technique by an amount approximately equal to the mass of coolant used in a conventional case. Furthermore, as illustrated in FIG. 3, the waste produced during regeneration in accordance with the Four Front method is cooler on average and essentially always contains some sorbate.

In the foregoing discussion it has been assumed that the regenerant fluid is hot, substantially sorbate-free product and that the cooling flow comprises cool, sorbate-free fluid having a temperature and sorbate concentration similar to product. These assumptions have been made for clarity of explanation. If, as is the case in systems employing recirculation regeneration, the hot regenerant stream comprises effluent recirculated through a condenser and heater, it may contain a significant sorbate concentration. Furthermore, the coolant will have a sorbate concentration dependent upon the equilibrium partial pressure of sorbate in the condenser/cooler.

In this situation the application of the Four Front method remains fundamentally unchanged. Thus, the quantity of regenerant used may be cut back until the savings of heat and effluent is offset by the residual mass and its resulting reduction in capacity. However, the cooling front will not be a single front but rather a transition involving several fronts. The transition from equilibrium with wet coolant to equilibrium with wet regenerant involves two or three fronts. First, a relatively slow desorption front similar to an FP front, and downstream, a faster front where the bulk of the temperature transition (cooling) occurs. In addition there will be a stripping front, faster still, which may or may not be distinguishable from the cooling front, depending on the temperature of the regenerant. The stripping front removes all or some of the sorbate that was in equilibrium with the hot, wet regenerant. It is the cooling front component of this PR transition which should be used to control the timing for collision with the RW front.

However, operation of conventionally designed recirculating regeneration sorption bed systems in accordance with the Four Front method will result in an even larger sorbate-loaded region (F) adjacent the product exit (regenerant entrance) end of the bed, unless the cooler/condenser is extraordinarily efficient. This sorbate will leave the bed early in the sorption stage and may unacceptably contaminate the product.

Figure 5:
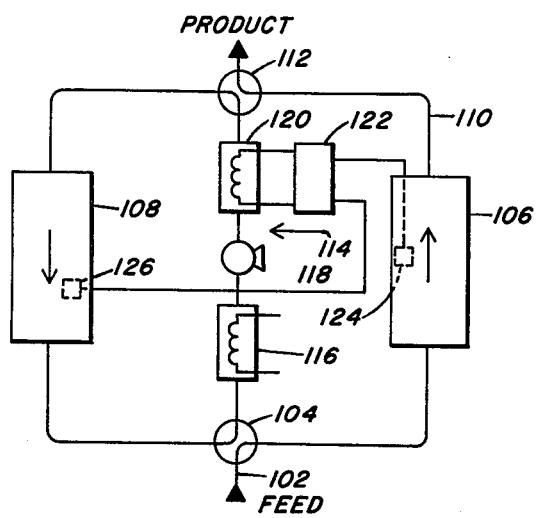
FIG. 5 is a schematic diagram of a multiple bed, cycling, sorption bed system of conventional design modified for exploiting the Four Front Method.

The multiple bed, cycling sorbent bed system illustrated in FIG. 5 is a common configuration for drying compressed air, modified for Four Front operation. Feed is brought to the system by a feed conduit 102 that passes through to valve 104. The valve 104 alternates supplying the feed to one of two sorption beds 106, 108. In the system as shown in FIG. 5, the feed is being supplied to the main sorption bed 106 on the right, where moisture is removed from the gas by the sorption process. That is, an FP front forms and moves through the bed 106 in the direction shown by the arrow. The product, dried air, for example, leaves the sorption bed 106 by a conduit 110 which passes through valve 112. Eventually, of course the sorption bed 106 is loaded with sorbate and requires regeneration.

In the meantime, the other main sorption bed 108 is connected by the valves 104 and 112 to a closed recirculating regeneration loop 114. The regeneration loop 114 includes a cooler condenser 116, a blower 118 for circulating gas through the loop, and a heater 120. The heater 120 is actuated by a control 122 which operates in response to the temperature sensors 124, 126, disposed within the beds 106, 108. The regeneration of the bed 108, previously loaded with sorbate from when it was in the sorption stage, is conducted by heating circulating gas with the heater 120, and passing it through the bed 108 countercurrent to the flow during the sorption stage, forming, eventually, an RW front.

Conventionally, the heater 120 is kept on until most of the moisture is condensed out in the cooler/condenser 116. Then the sorption bed 108 is cooled by circulating gas with the heater 120 off. The cooler/condenser 116 sees dry air coming out of the sorption bed 108 after the stripping front has left the bed during the time the bed 108 is being cooled in conventional recirculating regeneration.

Applying the Four Front Method to the multiple bed system of FIG. 5 requires turning the heater 120 off sooner, to produce a collision between the regeneration wave (the RW front) and the cooling wave (the PR front) near the exit of the main sorption bed 108. The heater 120 is turned off, e.g., by the control 122 when the sensor 126 detects the passage of the RW front. A timer can also be used. Provision of the controller 122 and sensors 124, 126 converts the beds to automatic Four Front operation.

However, if the heater 120 is turned off while the regeneration front is still in the sorption bed 108, concentrated waste is still coming out of the bed exit, and air containing some sorbate (water in air in this discussion) is still coming out of the cooler/condenser 116. This moist air is similar to the feed for the sorption beds. If the moist air is sent on to cooling duty (to form the PR front) it will deposit water on the dry end of the sorption bed 108. When the sorption bed 108 is returned to sorption duty, this water will come out with the dry product air.

If uniform extreme dryness is not required, this application of the Four Front method operating mode would be acceptable. The quantity of water left in the sorption bed 108 by the wet coolant would not be that large, since the wet coolant air flow would only be that amount needed for cooling the bed. For example, with activated alumina as the sorbent material of the bed 108, the bed will have about a 10% by weight capacity for sorption of water. If the coolant flow is at 100° F., 100 psig saturated, the concentration (y) of water in the coolant will be about 0.5%. Assuming that the air and the solid heat capacities per unit mass are about equal, and that it takes one bed mass of air to cool the mass of the sorption bed, this will lead to the deposit of 0.5%/10%, or 5%, of the bed's saturation capacity. If the sorption bed 108 is loaded to only half its saturation capacity during the sorption stage, the percentage of deposit to sorbate removed will be 10%. In other words, 10% of the water removed from the feed is returned to the bed during regeneration.

Under some conditions this may be acceptable. However, the moisture left in the sorption bed 108 during regeneration according to the Four Front approach will be deposited on the sorption bed 108 near the point the regeneration and cooling streams enter the bed. This moisture will then be located at the product exit end of the bed when it is returned to sorption duty at the end of the cycle, where the moisture will be picked up by product just stripped of moisture in an earlier portion of the sorption bed.

Figure 6:
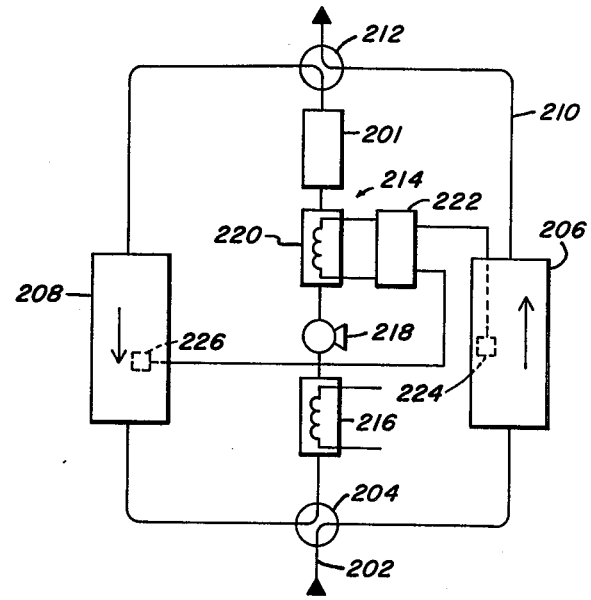
FIG. 6 is a bed system like that of FIG. 5, with a regeneration or tertiary bed added to the regeneration loop.

To achieve greater net drying of the air, a tertiary bed, hereinafter a "regeneration bed," is added to the regeneration loop. As shown in FIG. 6, such a system has a regeneration bed 201 in the regeneration loop 214 in series with the cooler/condenser 216, blower 218, and heater 220. As in the system shown in FIG. 5, feed enters the system through a feed conduit 202 and an input valve 204 that directs the feed to one of the main sorption beds 206. Product leaves the bed 206 through a line 210 to an output valve 212. Meanwhile the regeneration loop 214 is connected by the valves 204, 212 to the second main sorption bed 208 for regeneration controlled by the control 222, responsive to sensors 224 and 226 that are sensitive to the passage of RW fronts through the main beds 206, 208.

Figure 7A:
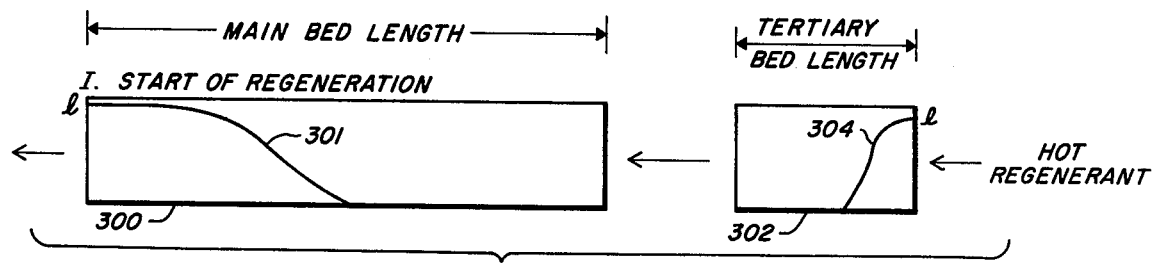
FIGS. 7A, B and C are schematic diagrams illustrating the sequence of events which occurs during the regeneration cycle in the sorption bed and regeneration bed in the embodiment of FIG. 6.
Figure 7B:
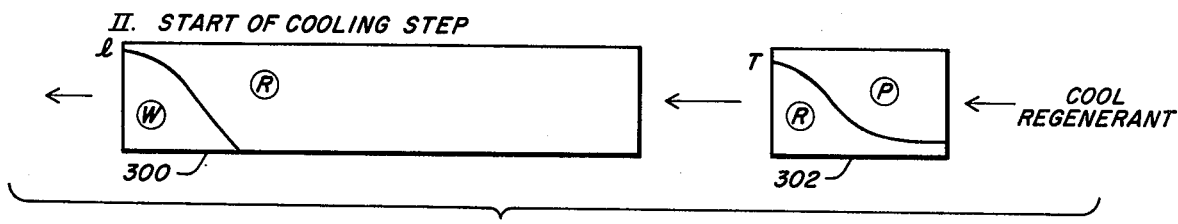
Figure 7C:
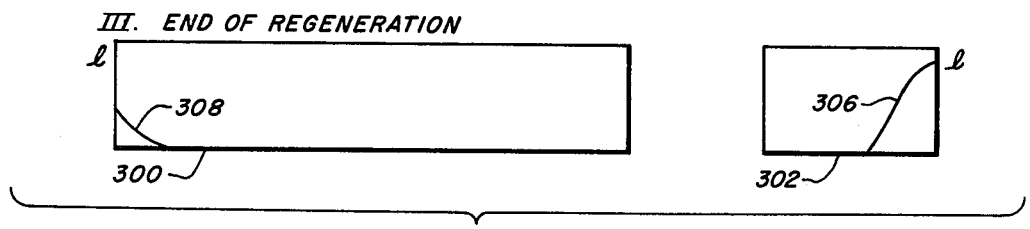

FIGS. 7A, 7B, and 7C illustrate the effect on the system imparted by the regeneration bed 201 shown in FIG. 6. In FIG. 7A, the rectangle 300 represents the length of a main sorption bed, e.g., 208, and the line 301 represents a profile of the sorbate loading in the bed 208 at the end of the bed's sorption stage and before the regeneration stage. As line 301 indicates, the bed is loaded near the feed entrance. The rectangle 302, representing the regeneration bed 201, shows a line 304 indicating that the regeneration bed's entrance area is loaded with moisture.

As regeneration begins, hot regenerant flows first through the regeneration bed 302 and then the main bed 300. In some circumstances, hot fluid may exit bed 302 prior to the bulk of the sorbate. Thus, sometimes a sorbate-rich region on bed 302 lags behind the leading temperature transition. This may result in a loaded region upstream of the leading thermal front in bed 300. This sorbate loading may end up in a region of the main bed 300 toward the regenerant entrance (product exit). This potential problem may be overcome as disclosed hereinafter. The hot effluent from regeneration bed 302 enters bed 300, heating it and ultimately generating an RW front as with conventional operation. In accordance with Four Front method of operation, well before the RW front exits the bed, cool regenerant is introduced into the system as the heater 220 is turned off so as to form a thermal PR front that will catch up to the RW front near the bed exit. Cooling first removes heat from hot, dry bed 302 (FIG. 7B). The coolant in the recirculation loop of the system is not, as explained above, completely dry, and accordingly, moisture in the coolant is stripped from the coolant by the sorbent solid in the regeneration bed 302, loading the bed near its entrance as indicated by the profile 306 in FIG. 7C. The PR front produced by the coolant transverses the main bed 300 and collides with the RW front. The result is shown in FIG. 7C. As shown also in FIG. 7C, a result typical of four front operation, namely, a "residual mass", is left at the effluent or waste exit end of the main bed 300. This residual mass is indicated by profile 308. Importantly however, the residual mass moisture is left at the feed entrance of the main bed, so that when the bed is returned to sorption duty, the moisture will not be carried out with product. The regeneration bed 302 does of course also contain moisture, but it is out of the sorption stage flow and is regenerated at the beginning of the next regeneration cycle.

The addition of the regeneration bed to the regeneration loop thus allows the multiple bed, cycling system to use the Four Front method and to realize fully its various advantages. The mass of the regeneration bed that achieves the effect described can be much smaller than the mass of the main beds. The mass of the regeneration bed 201 is typically less than 50% of the mass of main beds 206, 208, preferably less than 30%, and in many cases will not exceed 10%. The relative proportions will depend on such matters as the concentration of sorbate in the product desired and on the effectiveness of the cooler/condenser 216 used in the regeneration loop.

Indeed, one of the benefits of the regeneration bed system used in conjunction with the Four Front method of operation is that greater design flexibility for cooler/condensers used in the regeneration loop is possible. The cooler/condenser need dispose of less heat since less heat is used in regeneration using the Four Front method. Furthermore, the cooler/condenser in such a system sees a more uniform flow, with moderate temperatures and relatively constant sorbate concentrations.

The cooler/condenser sees a consistently wet stream when the Four Front method is used for a recirculating regeneration loop. With the conventional method of operating a regeneration loop, there is a period when the cooler/condenser must cool dry, hot air, so it must drain water quickly from the path of the dry air to prevent redeposition of water on the dry end of the main bed, and it must be designed for effective heat transfer from a dry gas.

Figure 8:
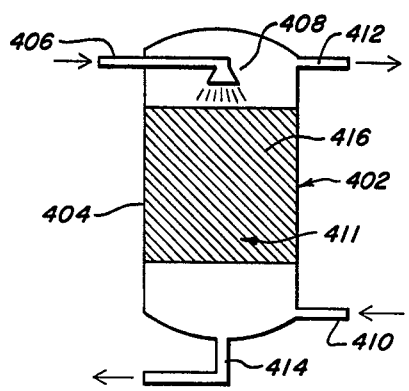
FIG. 8 is a schematic diagram of a direct contact condenser useful in the regeneration loop of the system shown in FIG. 6.

When using the Four Front method the sorbate, e.g., water, in the cooler/condenser may be utilized as an extended heat transfer surface. FIG. 8, for example, is a schematic diagram of a direct contact cooler/condenser 402 that may be used in the regeneration loop of the system of FIG. 6. A vessel 404 includes an inlet 406 for cold water to be sprayed downward from an upper spray head 408 in the upper part of the vessel 404. Wet, warm air from the recirculating stream enters the bottom part of the vessel 404 through an air inlet conduit 410, loses moisture through condensation, and is cooled as it rises through the mixing zone 411 to an air exit conduit 412 at the upper part of the vessel 404 and is returned to the recirculating stream. Water in the vessel 404, which is both the condensate and warmed cooling water, is drained from a drain 414 at the bottom of the vessel. Optionally, the vessel 404 may contain packing illustrated at 416 to enhance the effectiveness of the heat transfer. This type of cooler/condenser is particularly practical in low pressure systems. Effluent leaving conduit 412 will have a water content proportional to the partial pressure of water at a temperature maintained within vessel 404.

Figure 9:
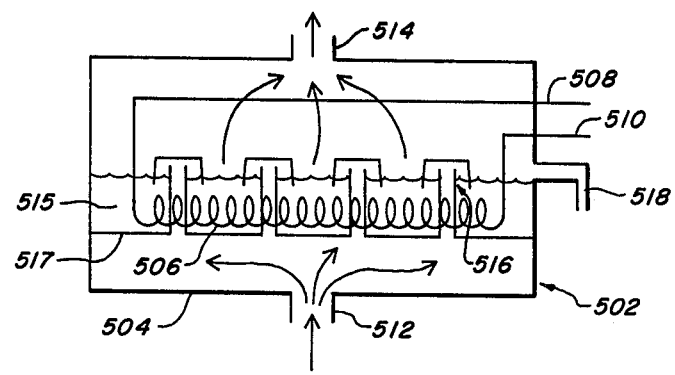
FIG. 9 is a schematic diagram of a condenser using water holdup, useful in the regeneration loop of the system shown in FIG. 6.

Another type of cooler/condenser that may be used is shown schematically in FIG. 9. The cooler/condenser 502 shown there includes a vessel 504 housinq a cooling coil 506 serviced by a cooling fluid inlet 508 and a cooling fluid outlet 510. An air inlet 512 at the bottom of the vessel 504 brings air from the regeneration stream to be cooled and condensed into the vessel; the sorbate loaded air passes through, e.g., conventional bubble caps 516; air exiting outlet 514 at the top has given up much of its water and heat; and passes as cooler, dryer air through an air outlet 514 at the top. Water 515 condensed from the cooled air is held up, or retained, in the vessel 504, on platform 517 and exits through drain 518. The retained condensate 515, in contact with the cooling coil 506, enhances heat transfer between the coolant in the coil 506 and the air to be cooled and dried, making the cooler/condenser more effective. This type of cooler/condenser is well-suited for pressurized regeneration loops. The cooling fluid may be, for example, a refrigerant such as a fluorocarbon. Where the sorbate is valuable, e.g., a petroleum fraction removed from a natural gas stream, it mey be collected from drain 518.

Figure 10:
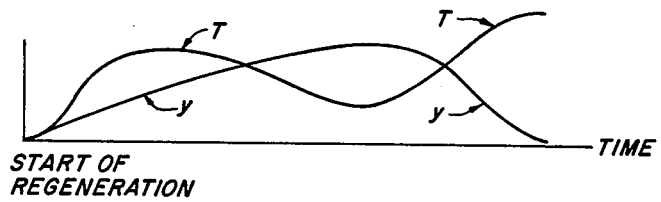
FIG. 10 is a graph showing the temperature and sorbate concentration in effluent leaving the regeneration bed shown in FIG. 6.

In the system illustrated in FIG. 6, the air exiting the regeneration bed 201 during early stages of the regeneration will vary in temperature and sorbate content as discussed with reference to FIGS. 7A-7C above. The profile of this tertiary bed effluent will be the outcome of a complex series of front collisions, but can be generally shown by the graph of FIG. 10. There the temperature and sorbate content of the air exiting the regeneration bed 201 over time during regeneration of the regeneration bed is illustrated schematically (vertical axis represents increasing I and 1). As the graph of FIG. 10 shows, a mass pulse of sorbate is created, with the moisture content first rising and then dropping, and the temperature first rising then tapering off, and then rising sharply. It is desirable to alter the temperature and sorbate content of fluid exiting the regeneration bed 201 that will enter main bed 208 so as to make its sorbate content more uniform and its temperature higher for a maintained period. If one imposes these characteristics on the effluent entering main bed 208, the opportunity for moisture in this mass pulse to resorb and remain in a main bed is greatly reduced.

Figures 11, 12:
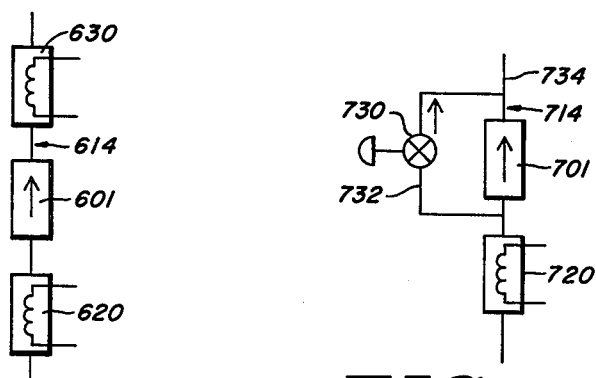
FIG. 11 is a schematic diagram of a portion of a regeneration loop similar to that of the system of FIG. 6, with a second heater added downstream of the regeneration bed.
FIG. 12 is a schematic diagram of a portion of a regeneration loop similar to that of the system of FIG. 6, including a conduit bypassing the regeneration bed.

One means for heating and smoothing out the sorbate concentration of the effluent from regeneration bed 201 is illustrated in FIG. 11. There a second heater 630 is placed downstream of the tertiary bed 601 and the first heater 620 in a regeneration circuit 614 that is otherwise the same as the regeneration circuit 214 of the system shown in FIG. 6. The second heater 630, minimizes readsorption by heating effluent from the tertiary bed 601. After the sorbate-rich effluent has been driven from bed 201, heater 630 may be inactivated.

Another means for stretching out and reducing the peak sorbate concentration of the effluent is to provide a bypass system. One exemplary bypass system is shown in FIG. 12. It comprises a bypass valve 730 and a bypass conduit path 732 to pass some hot regenerant from heater 720 around the regeneration bed 701. The regeneration circuit 714 is otherwise the same as the regeneration circuit 214 of the system shown in FIG. 6. The Valve 730 may be arranged to allow, for example, half of the output of the heater 720 to bypass the tertiary bed 701. The recombined flow in a conduit 734 downstream of the regeneration bed 701 would thus have a sorbate pulse twice as long and half as high as there would be without the bypass.

Figure 13:
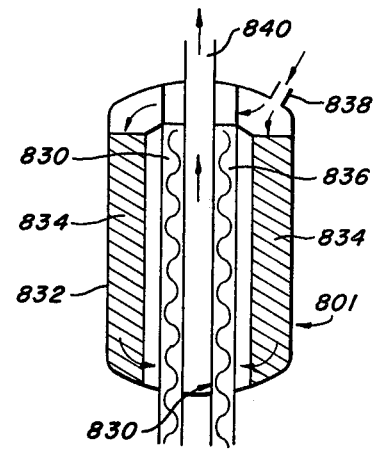
FIG. 13 is a schematic diagram of an exemplary arrangement of a heater within the regeneration bed.

FIG. 13 illustrates another system for heating the mass pulse and making it more uniform. In the device shown, there is a heater 830 internal, or coincident with, the regeneration bed 801 in a regeneration loop. This configuration is one of many possible internal heater bed designs. The regeneration bed 801 with internal heater 830, shown in FIG. 13, includes a housing 832, and sorbent mass 834 arranged as an annulus and heated by infrared radiation from axial heaters 830 spaced radially inwardly from the sorbent mass 834. Air enters the bed 801 at an inlet port 838, passes through the heated sorbent 834, passes over the heaters 836, and exits at an outlet port 840. The air is heated by convection and radiation. Sorbate in the mass 834 deposited during the previous regeneration cycle during the cooling stage is driven off the sorbent as it is heated by heater 830.

A heater internal to the tertiary bed may be the only heater in the regeneration loop, in fact, so that no external heaters, upstream or downstream of the tertiary bed are needed.

Other possible modifications of the system include substituting some other water or moisture removing device for the cooler/condensers shown in the regeneration loops of the various preferred embodiments. For example, an absorber might be used, instead of a condenser.

The sorbent material used for the regeneration bed need not be the same material as that used in the main beds. Indeed, the sorbent material in the regeneration bed may be chosen to be a tenacious water holder (e.g., zeolite) to reduce the magnitude of the peak of the mass pulse exiting the regeneration bed during its regeneration.

Furthermore, there are variations in the devices that may be used to activate certain steps in the regeneration stage. A timer may be used instead of the temperature sensor-controlled heater actuating device 122 of the system shown in FIG. 6, for example.

Figure 14:
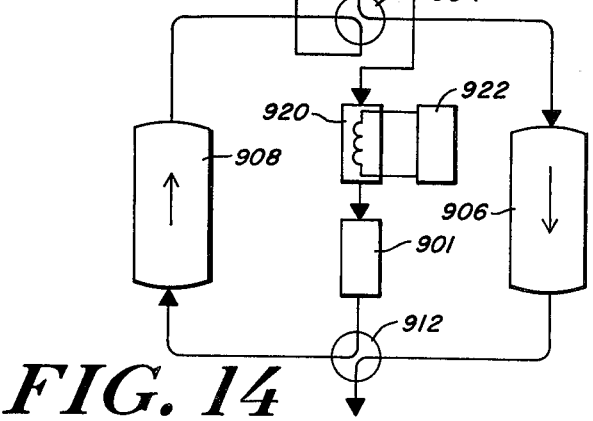
FIG. 14 is a schematic diagram of a multiple bed, recirculation regeneration, sorption bed system like that shown in FIG. 6, with a condenser positioned for cooling both the feed stream and the recirculating stream.

The regeneration loop need not have all its elements devoted solely to regeneration, nor be entirely isolated from the feed stream. In the system shown in FIG. 14, the condenser 916 is external and cools the entire feed to the system. The system includes a feed conduit 902, a feed valve 904, main beds 906, 908, an exit valve 912, a blower 918, a heater 920, a timer 922 controlling the heater 920, and a tertiary regeneration bed 901. Feed that has passed through the external condenser 916 is split into two streams, one used to regenerate main bed 908 while the other main bed 906 is treating the feed in a sorption stage. Switching the valves 904, 912 reverses the roles of the main beds 906, 908 in the system.

Figure 15:
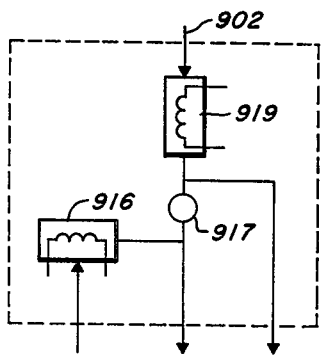
FIG. 15 is an alternative arrangement for use with the system of FIG. 14 illustrating the use of a pressure reducing valve as a means for moving the recirculating stream.

FIG. 15 shows another possible arrangement, this time employing a pressure reducing valve 917 and an option second heater 919. The arrangement of FIG. 15 may be substituted for the components in the box shown in phantom in FIG. 14. The pressure reducing valve 917 permits some fluid, at a high pressure, to be delivered to the regeneration loop while downstream of the valve, lower pressure fluid, supplemented by fluid exiting condenser 916, is delivered to bed 906.

Other modifications, deletions and additions to the illustrative embodiments of the invention may be made by those skilled in the art without departing from the spirit and scope of the invention, which is set forth in the following claims.

I claim:

1. A system of improved operational efficiency for cyclically treating a fluid feed stream in a sorption bed to reduce the concentration of a sorbate carried in said stream during a sorption stage and thermally regenerating said sorption bed by circulating a regeneration stream during a regeneration stage, said system comprising a main sorption bed comprising a housing defining a fluid feed flow path along a mass of sorbent material contained therein for treating fluid feed during said sorption stage, and a regeneration apparatus for circulating said regeneration stream through said main bed countercurrent to the direction of said fluid feed stream during said regeneration stage, wherein, in operation during said regeneration stage, during an interval when a hot regenerant fluid passes through said main sorption bed, there is created therein a RW front which moves in the direction of fluid flow and is bounded on its downstream side by bed conditions characteristic of equilibrium between the sorbent material and a fluid waste rich in sorbate, and on its upstream side by bed conditions characteristic of equilibrum between the sorbent material and the hot regenerant fluid, said apparatus comprising
    means for circulating said regeneration stream through the sorbent material in said main bed;
    means for removing sorbate from effluent exiting said main sorption bed during regeneration;
    means for cooling said regeneration stream;
    upstream of said main bed, means for heating said effluent;
    downstream from said sorbate removing means and said cooling means, a regeneration bed containing a sorbent material for reducing the concentration of sorbate in said effluent; and
    means for inactivating said heating means prior to the time the midpoint of said RW front exits the sorption bed.

2. The system of claim 1 wherein said regeneration bed contains a mass of sorbent material less than 50% that of the mass of sorbent material in said sorption bed.

3. The system of claim 1 wherein said regeneration bed contains a mass of sorbent material below 30% that of the mass of sorbent material in said sorption bed.

4. The system of claim 1 further comprising another main sorption bed and valve means for alternately operating one of said main sorption beds in the sorption stage while the other is operated in the regeneration stage.

5. The system of claim 1 wherein said means for removing sorbate from effluent exiting said main sorption bed and said cooler comprise a housing defining a cooling fluid inlet and a cooling fluid outlet, means defining a flow path for effluent passing therethrough, a heat transfer interface between cooling fluid and effluent within said housing, and a condensed sorbate outlet.

6. The system of claim 5 wherein said heat transfer interface comprises a mixing zone wherein said cooling fluid and said effluent are mixed and said cooling fluid outlet comprises said condensed sorbate outlet.

7. The system of claim 5 wherein said heat transfer interface comprises a conduit for transporting said cooling fluid between said inlet and outlet, means for retaining a portion of condensed sorbate produced within said housing in contact with said conduit, and means for passing said effluent through said retained portion of said condensed sorbate.

8. The system of claim 1 wherein said apparatus further comprises means for heating effluent from said regeneration bed and means for activating and inactivating said means for heating.

9. The system of claim 8 wherein said means for heating comprises a second heater downstream of said regeneration bed.

10. The system of claim 8 wherein said means for heating comprises a heater within said regeneration bed.

11. The system of claim 1 wherein said regeneration bed is downstream of said heating means.

12. The system of claim 11, including means for circulating a portion of the output of said heating means past said regeneration bed.

13. The system of claim 12, including valve control means controlling the amount of output of said heating means circulating through said circulating means.

14. The system of claim 1 wherein said sorbate comprises water.

15. The system of claim 1 wherein said inactivating means comprises a timer.

16. The system of claim 1 wherein said inactivating means comprises means for sensing an intrinsic property characteristic of fluid at a selected point within said main sorption bed.

17. The system of claim 1 wherein said sorbate comprises a mixture of petroleum fractions.

18. The system of claim 1 wherein said fluid feed comprises natural gas and said sorbate comprises a mixture selected from the group consisting of mixtures of $C_4$-$C_{10}$ petroleum fractions.

19. The system of claim 1 wherein said sorbent material of said main sorption bed is a different material than said sorbent material of said regeneration bed.

20. The system of claim 1 wherein said fluid feed stream passes through a portion of said regeneration loop.

21. The system of claim 1 wherein said means for circulating said regenerant stream comprises an inlet for receiving feed from said feed stream and a conduit containing sequentially, said means for heating, said regeneration bed, said main sorption bed and said means for cooling.

22. The system of claim 21 wherein said means for cooling provides an effluent which passes through conduit means in communication with said feed stream.

23. A system of improved operational efficiency for cyclically treating a fluid feed stream in a sorption bed to reduce the concentration of a sorbate carried in said stream during a sorption stage and thermally regenerating said sorption bed by circulating a regeneration stream during a regeneration stage, said system comprising a main sorption bed comprising a housing defining a fluid feed flow path along a mass of sorbent material contained therein for treating fluid feed during said sorption stage, and a regeneration apparatus for circulating said regeneration stream through said main bed countercurrent to the direction of said fluid feed stream during said regeneration stage, wherein said apparatus comprises:
means for circulating said regeneration stream through the sorbent material in said main bed;
means for removing sorbate from effluent exiting said main sorption bed during regeneration;
means for cooling said regeneration stream;
downstream from said sorbate removing means and said cooling means, a regeneration bed containing a sorbent material for reducing the concentration of sorbate in said effluent; and
upstream of said main bed, a heater within said regeneration bed for heating said effluent from said main sorption bed and from said regeneration bed.

24. The system of claim 23 wherein said means for removing sorbate from effluent exiting said main sorption bed and said cooler comprise a housing defining a cooling fluid inlet and a cooling fluid outlet, means defining a flow path for effluent passing therethrough, a heat transfer interface between cooling fluid and effluent within said housing, and a condensed sorbate outlet.

25. The system of claim 23 wherein said fluid feed stream passes through a portion of said regeneration loop.

26. A system of improved operational efficiency for cyclically treating a fluid feed stream in a sorption bed to reduce the concentration of a sorbate carried in said stream during a sorption stage and thermally regenerating said sorption bed by circulating a regeneration stream during a regeneration stage, said system comprising a main sorption bed comprising a housing defining a fluid feed flow path along a mass of sorbent material contained therein for treating fluid feed during said sorption stage, and a regeneration apparatus for circulating said regeneration stream through said main bed countercurrent to the direction of said fluid feed stream during said regeneration stage, wherein said apparatus comprises:
means for circulating said regeneration stream through the sorbent material in said main bed;
means for removing sorbate from effluent exiting said main sorption bed during regeneration;
means for cooling said regeneration stream;
downstream from said sorbate removing means and said cooling means, a regeneration bed containing a sorbent material for reducing the concentration of sorbate in said effluent;
upstream of said main bed and said regeneration bed, means for heating said effluent; and
means for circulating a portion of the output of said means for heating around said regeneration bed.

27. The system of claim 26 including valve control means controlling the amount of output of said heating means circulating around said regeneration bed.

28. The system of claim 26 wherein said means for removing sorbate from effluent exiting said main sorption bed and said cooler comprise a housing defining a cooling fluid inlet and a cooling fluid outlet, means defining a flow path for effluent passing therethrough, a heat transfer interface between cooling fluid and effluent within said housing, and a condedsed sorbate outlet.

29. The system of claim 26 wherein said fluid feed stream passes through a portion of said regeneration loop.

30. The system of claim 26 wherein said means for circulating said regenerant stream comprises an inlet for receiving feed from said feed stream and a conduit containing sequentially, said means for heating, said regeneration bed, said main sorption bed and said means for cooling.

31. The system of claim 30 wherein said means for cooling provides an effluent which passes through conduit means in communication with said feed stream.

32. The system of claim 30 wherein said means for cooling provides an effluent which passes through conduit means in communication with said feed stream.

33. A system of improved operational efficiency for cyclically treating a fluid feed stream in a sorption bed to reduce the concentration of a sorbate carried in said stream during a sorption stage and thermally regenerating said sorption bed by circulating a regeneration stream during a regeneration stage, said system comprising a main sorption bed comprising a housing defining a fluid feed flow path along a mass of sorbent material contained therein for treating fluid feed during said sorption stage, and a regeneration apparatus for circulating said regeneration stream through said main bed countercurrent to the direction of said fluid feed stream during said regeneration stage, wherein said apparatus comprises:

means for circulating said regeneration stream through the sorbent material in said main bed;

means for removing sorbate from effluent exiting said main sorption bed during regeneration;

means for cooling said regeneration stream;

downstream from said sorbate removing means and said cooling means, a regeneration bed containing a sorbent material for reducing the concentration of sorbate in said effluent;

upstream of said main bed and said regeneration bed, means for heating said effluent from said main sorption bed; and a second heater, downstream from said regeneration bed, for heating the effluent from said regeneration bed.

34. The system of claim 33 wherein said means for removing sorbate from effluent exiting said main sorption bed and said cooler comprise a housing defining a cooling fluid inlet and a cooling fluid outlet, means defining a flow path for effluent passing therethrough, a heat transfer interface between cooling fluid and effluent within said housing, and a condensed sorbate outlet.

35. The system of claim 33 wherein said fluid feed stream passes through a portion of said regeneration loop.

36. The system of claim 33 wherein said means for circulating said regenerant stream comprises an inlet for receiving feed from said feed stream and a conduit containing sequentially, said means for heating, said regeneration bed, said main sorption bed and said means for cooling.

* * * * *

UNITED STATES PATENT AND TRADEMARK OFFICE
CERTIFICATE OF CORRECTION

PATENT NO. : 4,479,814

DATED : October 30, 1984

INVENTOR(S) : Michael D. Oliker

It is certified that error appears in the above-identified patent and that said Letters Patent are hereby corrected as shown below:

Column 21, line 1, delete "30" and substitute --36--.

Signed and Sealed this

Twenty-third Day of July 1985

[SEAL]

Attest:

DONALD J. QUIGG

*Attesting Officer*   *Acting Commissioner of Patents and Trademarks*